United States Patent
Han et al.

(10) Patent No.: US 11,112,549 B2
(45) Date of Patent: Sep. 7, 2021

(54) POLARIZER, DISPLAY PANEL INCLUDING THE SAME AND METHOD OF MANUFACTURING THE SAME

(71) Applicant: SAMSUNG DISPLAY CO, LTD., Yongin-si (KR)

(72) Inventors: Kang-Soo Han, Soeul (KR); Eun-Jung Kim, Suwon-si (KR); Gug-Rae Jo, Asan-si (KR); Hyung-Bin Cho, Seongnam-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 16/261,722

(22) Filed: Jan. 30, 2019

(65) Prior Publication Data
US 2019/0162891 A1    May 30, 2019

Related U.S. Application Data

(62) Division of application No. 14/799,804, filed on Jul. 15, 2015, now Pat. No. 10,222,527.

(30) Foreign Application Priority Data

Oct. 29, 2014 (KR) .................. 10-2014-0148420

(51) Int. Cl.
*G02B 5/30* (2006.01)
*G02F 1/1335* (2006.01)

(52) U.S. Cl.
CPC ...... *G02B 5/3058* (2013.01); *G02F 1/133548* (2021.01)

(58) Field of Classification Search
CPC ..... G02F 2001/133548; G02F 2201/30; G02F 2201/305; G02F 2201/307; G02B 5/3058; G02B 5/18; G02B 5/1852; B32B 37/10; B32B 37/1027; B29D 11/00769
See application file for complete search history.

(56) References Cited

U.S. PATENT DOCUMENTS

| 7,872,803 B2 | 1/2011 | Uejima et al. |
| 8,137,496 B2 | 3/2012 | Lee et al. |
| 8,373,928 B2 | 2/2013 | Ha et al. |
| 8,730,575 B2 | 5/2014 | Kaida et al. |

(Continued)

FOREIGN PATENT DOCUMENTS

| CN | 101055329 | 10/2007 |
| CN | 101981479 | 2/2011 |

(Continued)

OTHER PUBLICATIONS

Sang Chul Oh et al., "Fabrication of Aluminum Nano-Scale Structures using Direct-Embossing with a Nickel Template", Met. Mater, Int., vol. 17, No. 5 (2011), pp. 771-775.

(Continued)

*Primary Examiner* — Angela K Davison

(57) ABSTRACT

A polarizer includes a buffer member and linear metal patterns. The buffer member includes protrusions. Each protrusion has downwardly-increasing width. The buffer member is formed of polymer. The linear metal patterns, spaced apart from each other, are extended in a first direction. Each linear metal pattern covers a respective protrusion.

13 Claims, 15 Drawing Sheets

(56) References Cited

U.S. PATENT DOCUMENTS

| | | | |
|---|---|---|---|
| 8,896,923 B2 | 11/2014 | Okayasu | |
| 9,618,793 B2 | 4/2017 | Nam et al. | |
| 2005/0088739 A1 | 4/2005 | Chiu et al. | |
| 2007/0242187 A1 | 10/2007 | Yamaki et al. | |
| 2007/0242352 A1 | 10/2007 | MacMaster | |
| 2008/0129931 A1* | 6/2008 | Takahashi | G02B 5/3058 349/96 |
| 2008/0137188 A1 | 6/2008 | Sato et al. | |
| 2011/0080640 A1 | 4/2011 | Kaida et al. | |
| 2011/0084424 A1 | 4/2011 | Kaida et al. | |
| 2011/0096396 A1* | 4/2011 | Kaida | C23C 14/024 359/492.01 |
| 2012/0038085 A1* | 2/2012 | Ahn | B82Y 20/00 264/293 |
| 2013/0040052 A1 | 2/2013 | Akita et al. | |
| 2015/0062497 A1 | 3/2015 | Nam et al. | |
| 2015/0198845 A1 | 7/2015 | Lee et al. | |
| 2016/0124133 A1 | 5/2016 | Han et al. | |

FOREIGN PATENT DOCUMENTS

| | | |
|---|---|---|
| CN | 102109623 | 6/2011 |
| CN | 102834750 | 12/2012 |
| JP | 2002-303726 | 10/2002 |
| JP | 2010-48999 | 3/2010 |
| JP | 2010-91622 | 4/2010 |
| KR | 100642003 | 2/2006 |
| KR | 1020080020610 | 3/2008 |
| KR | 1020090108592 | 10/2009 |
| KR | 10-0980284 | 8/2010 |
| KR | 1020120006179 | 1/2012 |
| KR | 1020130070221 | 6/2013 |
| KR | 1020140118027 | 10/2014 |
| WO | 2009-104861 | 8/2009 |
| WO | 2011002042 | 1/2011 |

OTHER PUBLICATIONS

Office Action dated Feb. 2, 2019 from the Chinese Patent Office in corresponding Chinese Patent Application No. 201510701072.3.

OA dated Nov. 19, 2020 from the Korean Intellectual Property Office (KIPO) in corresponding Korean Appln No. KR 10-2014-0148420.

Office Action dated May 27, 2021 from the Chinese Patent Office in corresponding Chinese Application No. 201911167343.6.

* cited by examiner

POLARIZER, DISPLAY PANEL INCLUDING THE SAME AND METHOD OF MANUFACTURING THE SAME

CROSS-REFERENCE TO RELATED APPLICATIONS

This application is a divisional application of U.S. patent application Ser. No. 14/799,804 filed Jul. 15, 2015, which claims priority under 35 U.S.C. § 119 to Korean Patent Application No. 10-2014-0148420, filed on Oct. 29, 2014, in the Korean Intellectual Property Office, the disclosures of which are incorporated by reference herein in their entirety.

TECHNICAL FIELD

The present invention relates to a wire grid polarizer, a method of manufacturing the polarizer and a display panel including the polarizer.

DISCUSSION OF THE RELATED ART

Polarizers control transmittance of light. The polarizers may transmit a polarizing component parallel to a transmitting axis, and may absorb or reflect a polarizing component perpendicular to the transmitting axis.

The polarizers include an absorbing polarizer and a reflective polarizer. The reflective polarizer reflects a specific polarizing component of an incident light for polarization. The reflective polarizing component of the incident light may be reused by a reflective plate of a backlight assembly to increase brightness of a display device.

SUMMARY

According to an exemplary embodiment of the present invention, a polarizer includes a buffer member and linear metal patterns. The buffer member includes protrusions. Each protrusion has downwardly-increasing width. The buffer member is formed of polymer. The linear metal patterns, spaced apart from each other, are extended in a first direction. Each linear metal pattern covers a respective protrusion.

According to an exemplary embodiment of the present invention, a method of manufacturing a polarizer is provided as follows. A buffer layer including a polymer and a metal layer are formed. The metal layer is formed on the buffer layer. Linear metal patterns and a plurality of protrusions are formed from the metal layer and the buffer layer, respectively, by pressing the metal layer and the buffer layer using a mold having a pressing pattern. At least a portion of each protrusion is inserted into a respective metal pattern.

According to an exemplary embodiment of the present invention, a display panel includes a first substrate, a second substrate facing the first substrate and a liquid crystal layer disposed between the first substrate and the second substrate. The first substrate includes a polarizer including a plurality of linear metal patterns, and a buffer member, formed of polymer, having a plurality of protrusions. A portion of each protrusion is inserted into a respective linear metal pattern. Each protrusion has a tapered shape.

According to an exemplary embodiment of the present invention, a display panel includes a buffer member and metal lines. The buffer member includes protrusions. Each protrusion is protruded from an upper surface of the buffer member, and the protrusions cause the buffer member to have a corrugated surface. The metal lines are disposed on the corrugated surface of the buffer member. Each protrusion is enclosed by a respective metal line, and two adjacent metal lines expose a part of the upper surface of the buffer member therebetween.

BRIEF DESCRIPTION OF THE DRAWINGS

These and other features of the inventive concept will become more apparent by describing in detail exemplary embodiments thereof with reference to the accompanying drawings of which.

DETAILED DESCRIPTION OF EXEMPLARY EMBODIMENTS

Figure 1:
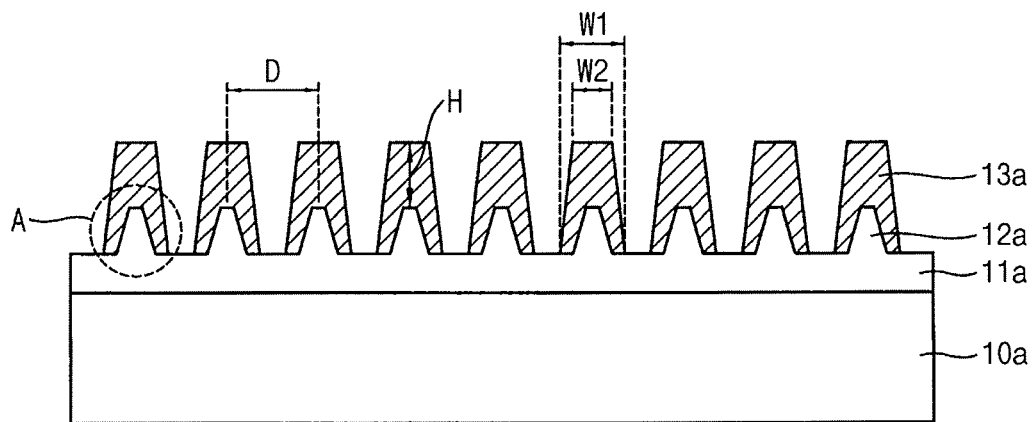
FIG. 1 is a cross-sectional view of a polarizer according to an exemplary embodiment of the present invention.

Exemplary embodiments of the present invention will be described below in detail with reference to the accompanying drawings. However, the present invention may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

Figure 2:
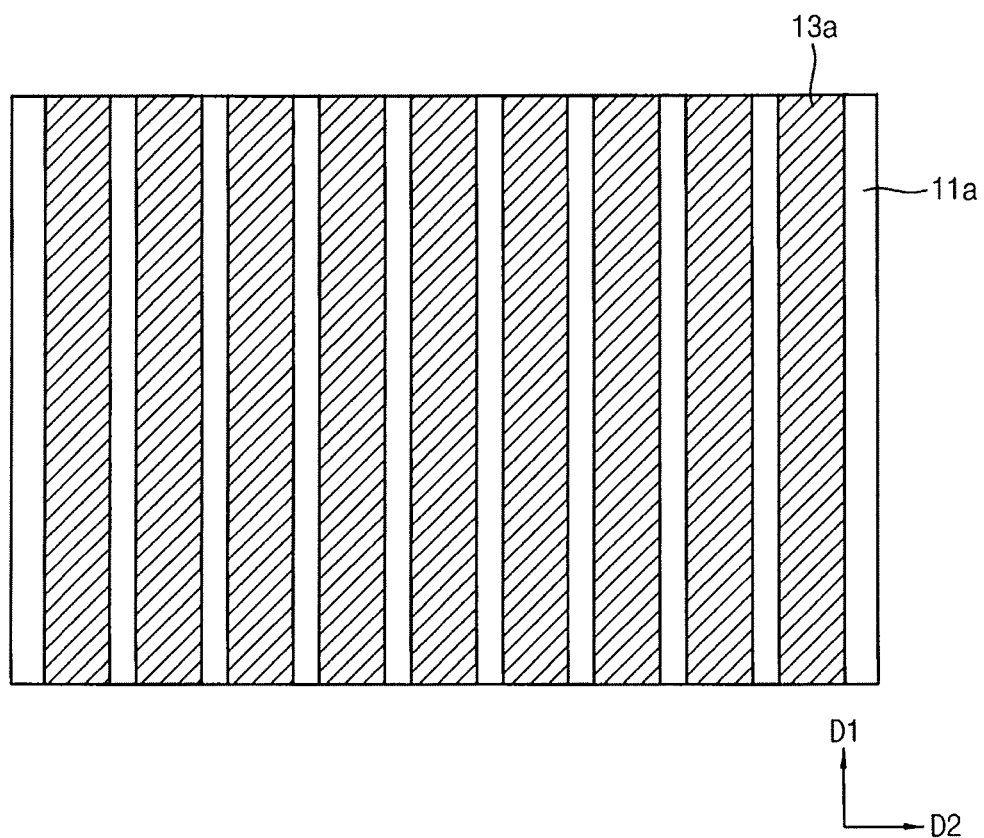
FIG. 2 is a plan view of a polarizer according to an exemplary embodiment of the present invention.
Figure 3:
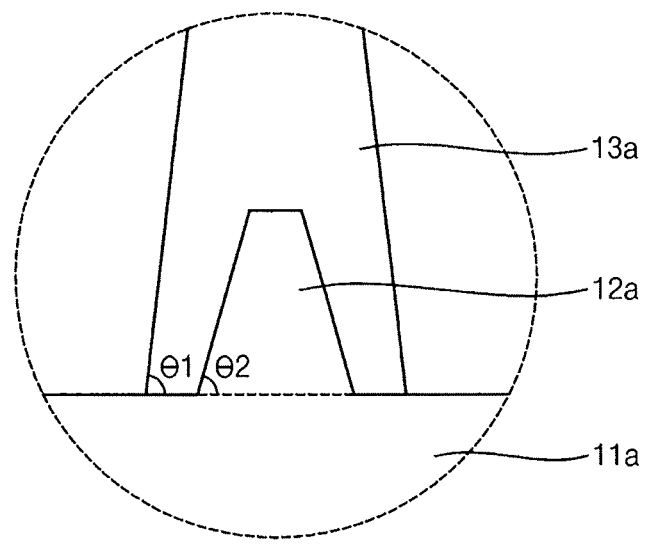
FIG. 3 is an enlarged cross-sectional view of region 'A' of FIG. 1.

FIG. 1 is a cross-sectional view of a polarizer according to an exemplary embodiment. FIG. 2 is a plan view of a polarizer according to an exemplary embodiment. FIG. 3 is an enlarged cross-sectional view of the region 'A' of FIG. 1.

Referring to FIGS. 1 and 2, a polarizer includes a base substrate 10a, a buffer member 11a disposed on the base substrate 10a, and a wire grid array disposed on the buffer member 11a. The wire grid array includes a plurality of linear metal patterns 13a extending in a first direction D1 and spaced apart from each other in a second direction D2 crossing the first direction D1. The buffer member 11a includes a protrusion 12a. At least a portion of the protrusion 12a is inserted into the linear metal pattern 13a.

The base substrate 10a may include a glass substrate, a quartz substrate, a sapphire substrate, a plastic substrate or the like. The plastic substrate may include polyimide, polyethylene terephthalate, polyethylene naphthalate, polyvinyl chloride or the like.

The base substrate 10a may be removed after the wire grid array is formed.

If the buffer member 11a has a sufficient thickness, the base substrate 10a may be omitted in a manufacturing of the wire grid array. In this case, the removal of the base substrate 10a after the formation of the wire grid array may be omitted.

The buffer member 11a includes a polymer so that the buffer member 11a is resilient. The polymer may include thermoplastic resin or thermosetting resin. For example, the buffer member 11a may include polymethylmethacrylate, polydimethyl siloxane, polycarbonate, polyethylene terephthalate, polystyrene, polyethylene, polypropylene, polyvinylalcohol or the like. The polymer may be modified or copolymers.

In an exemplary embodiment, the buffer member 11a may include a polymer having a rubber phase at a room temperature and having a softening point equal to or less than about 50° C. For example, the buffer member 11a may include polydimethyl siloxane or a copolymer thereof. Examples of the polydimethyl siloxane copolymer may include polydimethyl siloxane/polycarbonate copolymer, polydimethyl siloxane/polymethylmethacrylate copolymer or the like.

Alternatively, the buffer member 11a may include a polymer having a softening point equal to or more than about 100° C. For example, the buffer member 11a may include polyethylene, polypropylene, polydimethyl siloxane or a copolymer thereof.

The buffer member 11a may have various thickness, depending on a thickness of the linear metal pattern 13a and a manufacturing process. For example, a thickness of the buffer member 13a may be about 30 nm to about 500 nm.

The buffer member 11a includes the protrusion 12a protruding from an upper surface of the buffer member 11a. For example, the buffer member 11a may include a base having a flat layer shape, and the protrusion 12a protruding from the base. The protrusion 12a is inserted into the linear metal pattern 13a so that an upper surface and a side surface of the protrusion 12a are covered by the linear metal pattern 13a. In an exemplary embodiment, a substantially entire portion of the protrusion 12a may be inserted into the linear metal pattern 13a.

The protrusion 12a may extend in the same direction as the linear metal pattern 13a extends. For example, the protrusion 12a extends in the first direction D1. The protrusion 12a is disposed to correspond to each of the linear metal patterns 13a. Thus, protrusions 12a are arranged in the second direction D2 to be parallel to each other. The protrusion 12a is formed with the buffer member 11a in a unitary single unit. Thus, the protrusion 12a and the buffer member 11a are formed of the same material.

The wire grid array serves to perform polarization. For example, when a light is incident on the wire grid array, a component of the light, which is parallel to a transmitting axis of the wire grid array, may be transmitted, and a component of the light, which is perpendicular to the transmitting axis of the wire grid array, may be reflected.

The linear metal pattern 13a may include a metal. For example, the linear metal pattern 13a may include aluminum, gold, silver, copper, chromium, iron, nickel, titanium, molybdenum, tungsten or an alloy thereof. In an exemplary embodiment, the linear metal pattern 13a may include aluminum, gold, silver or copper. In an exemplary embodiment, the linear metal pattern 13a includes aluminum, which has relatively high ductility and reflectivity. Furthermore, the linear metal pattern 13a may have a multiple-layered structure including different metal layers. Furthermore, the linear metal pattern 13a may further include a metal oxide, a metal nitride or the like.

The linear metal patterns 13a may have a pitch, a thickness and a line width such that the linear metal patterns 13a serve to polarize light.

For example, a pitch of the linear metal patterns 13a may be less than a wavelength of an incident light. For example, the pitch P of the linear metal patterns 13a may be equal to or less than about 400 nm for polarizing a visible light. In an exemplary embodiment, the pitch P of the linear metal patterns 13a may be equal to or less than about 150 nm. For example, the pitch of the linear metal patterns 13a may be about 50 nm to about 150 nm.

In an exemplary embodiment, a thickness H of the linear metal pattern 13a may be defined as a length between an upper end of the protrusion 12a and an upper end of the linear metal pattern 13a. The thickness H of the linear metal pattern 13a may be equal to or greater than about 80 nm. In an exemplary embodiment, the thickness H may be about 80 nm to about 300 nm.

Transmittance or refractivity of the wire grid array may depend on a ratio of the line width to the pitch P. The line width may be differently defined depending on a shape of the linear metal pattern 13a and a size of the protrusion 12a. For example, the line width may be defined as a width W1 of a lower end of the linear metal pattern 13a or a width W2 of an upper end of the linear metal pattern 13a. The linear metal pattern 13a may have a tapered shape. Thus, the width W1 of the lower end may be greater than the width W2 of the upper end. In an exemplary embodiment, the line width may be less than or equal to about 100 nm. For example, the line width may be about 20 nm to about 100 nm.

Referring to FIG. 3, the protrusion 12a of the buffer member 11a and the linear metal pattern 13a may have a tapered shape including a lower end wider than an upper end.

Thus, a taper angle θ1 of the linear metal pattern 13a, which is defined by a side surface of the linear metal pattern 13a and an upper surface of the buffer member 11a, and a taper angle θ2 of the protrusion 12a, which is defined by a side surface of the protrusion 12a and a horizontal line extending from the upper surface of the buffer member 11a, may be less than about 90°. Furthermore, the taper angle θ2 of the protrusion 12a may be less than the taper angle θ1 of the linear metal pattern 13a.

While the linear metal pattern 13a, shown in FIG. 1, has a tapered shape such that the width W1 of the lower end is greater than the width W2 of the upper end, the present invention is not limited thereto. The shape of the linear metal pattern 13a may vary depending on, for example, a shape of a mold. For example, a cross-section of the linear metal pattern 13a may have a substantially rectangular shape to increase polarization.

Furthermore, while a cross-section of the protrusion 12a has a trapezoid shape in FIGS. 1 to 3, the present invention is not limited thereto. The cross-section of the protrusion 12a may vary depending on, for example, a shape of a mold or a condition in a manufacturing process. For example, the cross-section of the protrusion 12a may have a triangular shape, an arc shape or the like.

FIGS. 4 to 7 are cross-sectional views illustrating a method of manufacturing a polarizer of FIG. 1. FIG. 8 is a perspective view of a pressing process using a roller.

Figure 4:
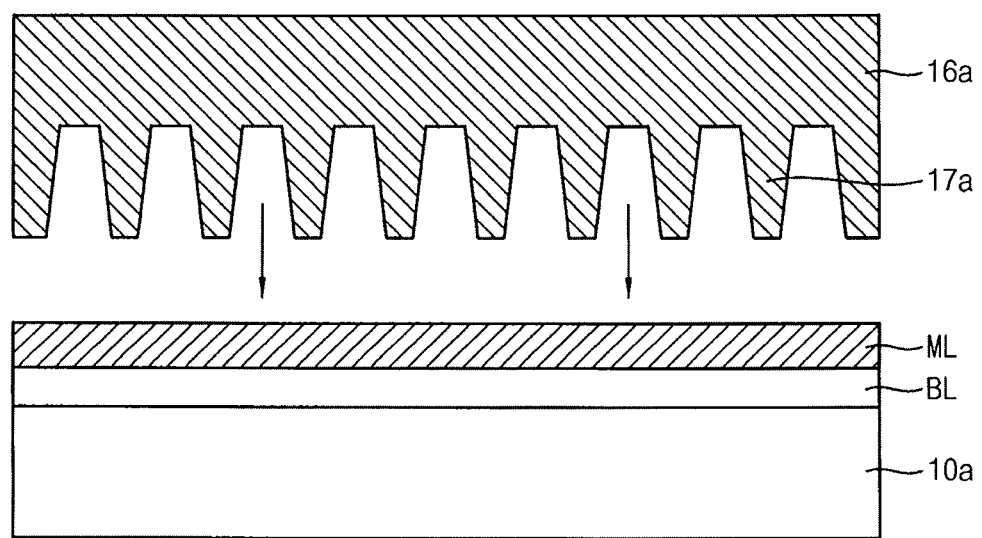
FIGS. 4 to 7 are cross-sectional views illustrating a method of manufacturing a polarizer illustrated in FIG. 1 according to an exemplary embodiment of the present invention.
Figure 5:
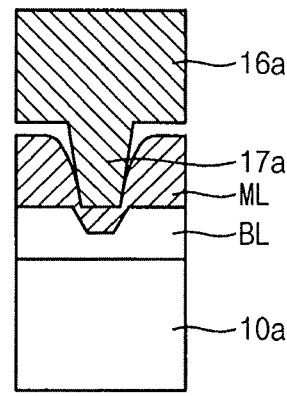

Referring to FIGS. 4 and 5, a buffer layer BL is formed on a base substrate 10a, and a metal layer ML is formed on the buffer layer BL.

The buffer layer BL may include polymethylmethacrylate, polydimethyl siloxane, polycarbonate, polyethylene terephthalate, polystyrene, polyethylene, polypropylene, polyvinylalcohol or a copolymer thereof.

A composition including the polymer dispersed in a solvent such as an alcohol, a glycol, an ether or the like may be provided on the base substrate 10a. The solvent may be removed through a drying process to form the buffer layer BL. In an exemplary embodiment, the buffer layer BL is first formed to a sheet shape, and the buffer layer BL is attached to the base substrate 10a, for example, through lamination. In an exemplary embodiment, a composition including a polymer resin, a curing agent and a polymerization initiator is provided on the base substrate 10a, and the composition may be cured through heat-curing or photo-curing to form the buffer layer BL including a cured polymer resin.

The metal layer ML may include aluminum, gold, silver, copper, chromium, iron, nickel, titanium, molybdenum, tungsten or an alloy thereof. In an exemplary embodiment, the metal layer ML may include aluminum, gold, silver or copper. The metal layer ML may be formed through a conventional method for forming a metal layer, for example, sputtering, lamination or the like.

After the metal layer ML is formed, a mold 16a including a pressing pattern 17a is disposed on the metal layer ML to press the metal layer ML. The pressing pattern 17a approaches the metal layer ML in the pressing process.

The mold 16a includes a material having a surface hardness higher than the metal layer ML. For example, the mold 16a may include a material having a high surface hardness, such as silicon, nickel, tungsten or the like.

The pressing pattern 17a extends in a direction. A plurality of pressing patterns 17a are arranged in a direction crossing the extending direction to be parallel with each other. A cross-section of the pressing pattern 17a has a tapered shape so that a width of an upper end is greater than a width of a lower end. The pressing patterns 17a are spaced apart from each other to form a groove therebetween. The groove may have a shape substantially same as a linear metal pattern to be formed in the pressing process.

Figure 6:
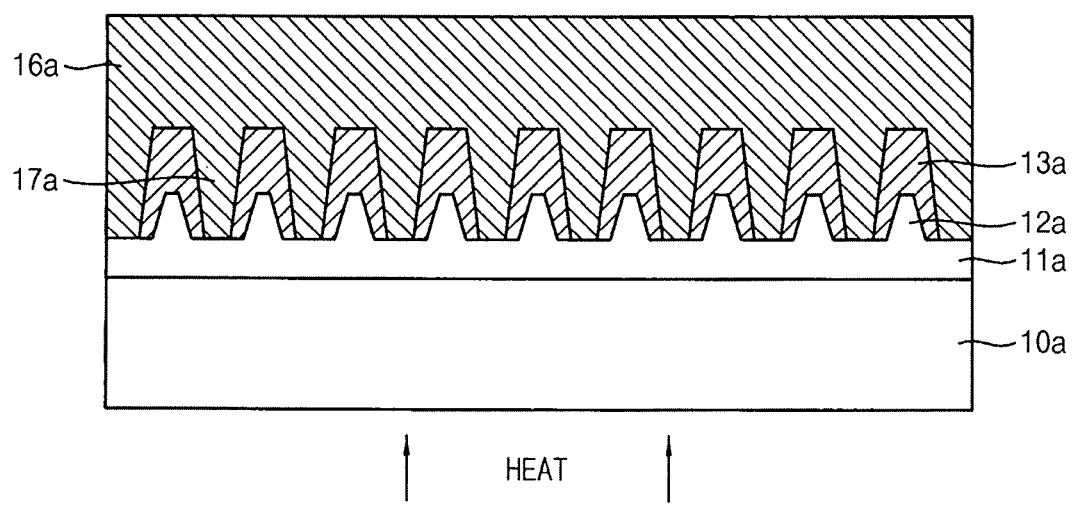

Referring to FIGS. 5 and 6, as the mold 16a is pressed to the metal layer ML, a shape of a pressing surface of the mold 16a is transferred to the metal layer ML and the buffer layer BL. A portion of the metal layer ML and a portion of the buffer layer BL are deformed along the shape of the pressing surface of the mold 16a. Although the buffer layer BL has rubber resilience, the deformed portion of the buffer layer BL is covered by a plastically deformed portion of the metal layer ML and thus the deformed portion of the buffer layer BL keeps a protruded shape. which contacts the lower end of the pressing pattern 17a, may penetrate into the buffer layer NL. In the process of transferring, the metal layer ML may be elongated along the deformed portion of the buffer layer BL and the elongated metal layer ML is disconnected in an area contacting the lower end of the pressing pattern 17a.

As a result, a wire grid array including a plurality of linear metal patterns 12a spaced apart from each other and arranged parallel with each other. Furthermore, the buffer layer BL is partially pressed to form a buffer member 11a including a protrusion 12a inserted into the linear metal pattern 13a. Even if the buffer member 11a include a polymer having a rubber phase at a room temperature, because the protrusion 12a is restrained by the linear metal pattern 13a, a shape of the protrusion 12a may be maintained. Because the protrusion 12a is formed by penetration of the pressing pattern 17a, the protrusion 12a may have a taper angle less than the linear metal pattern 13a.

In the process of pressing the mold 16a, the metal layer ML and the buffer layer BL may be heated. For example, if the buffer layer BL includes a polymer having a solid phase at a room temperature, and if the pressing process is performed at a room temperature, the buffer layer BL may have insufficient flexibility. When the polymer having a solid phase at a room temperature is heated at temperature near a glass transition temperature or a softening point, the phase of the polymer is changed to a rubber phase. Thus, the buffer layer BL may provide sufficient flexibility and resilience.

The heating temperature may vary depending on properties of the polymer of the buffer layer BL. For example, the heating temperature may be, but is not limited to, about 100° C. to about 200° C.

In an exemplary embodiment, heat HEAT is provided through the base substrate 10a. For example, a conveyer belt transferring the base substrate 10a may include a heart to heat the base substrate 10a. Alternatively, the mold 16a may be heated. The heat may be provided before the mold 16a approach the base substrate 10a.

In an exemplary embodiment, the mold 16a may have a plate shape. Alternatively, the mold 16a, shown in FIG. 8, may have a roller shape. The mold having a roller shape may reduce manufacturing time in manufacturing a large-sized polarizer.

Figure 7:
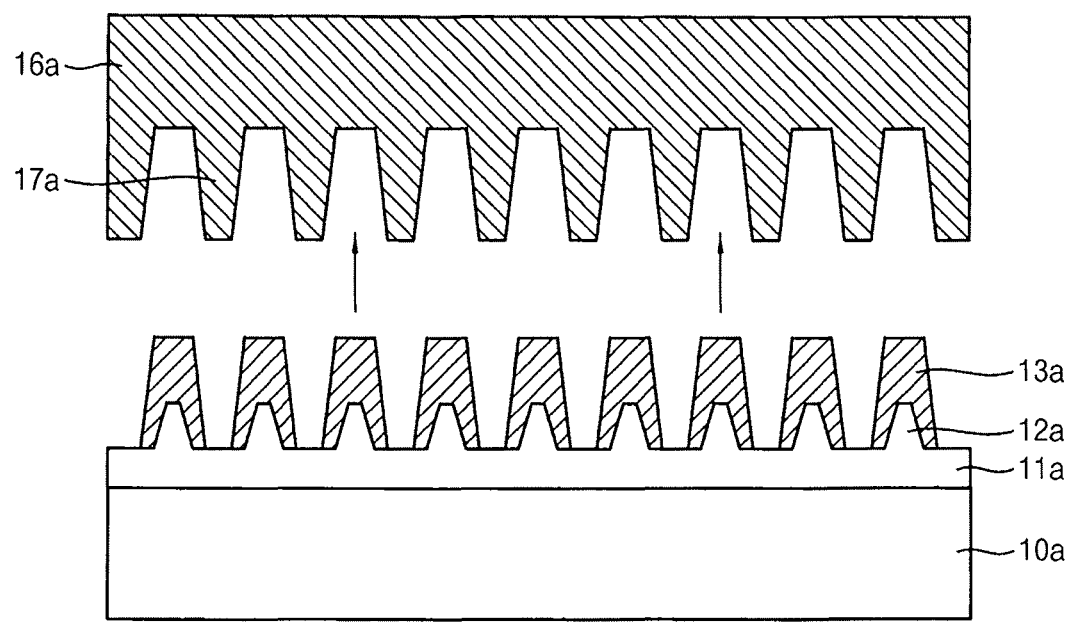
Figure 8:
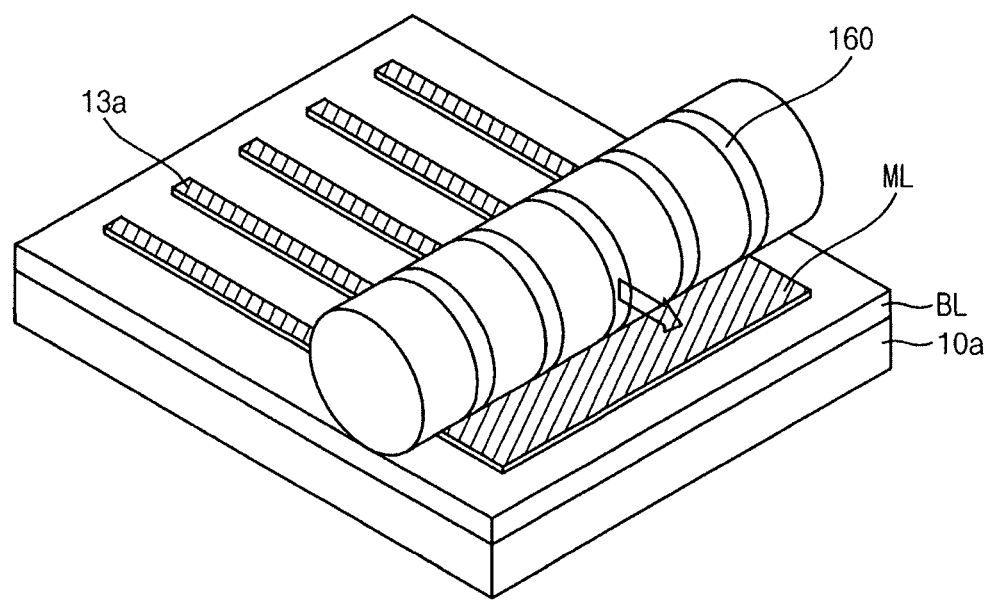
FIG. 8 is a perspective view of a pressing process using a roller.

Referring to FIG. 7, the mold 16a is pulled off from the buffer member 11a and the wire grid array.

According to an exemplary embodiment, a mold may be directly pressed into a metal layer disposed on a buffer layer that provides resilience and flexibility to form a wire grid array. Thus, an etching process using a mask may be omitted. Thus, damage to a wire grid pattern due to an etching process may be prevented or reduced. Furthermore, manufacturing time for a polarizer may be reduced.

Furthermore, since a protrusion of a buffer member is inserted into a linear metal pattern, a lower surface of the linear metal pattern has an uneven cross-section. Thus, when the polarizer is employed in a display substrate, reflection of an external light may be prevented or reduced to increase display quality.

Furthermore, the polarizer may include a buffer member having flexibility, or may be directly formed on a flexible substrate. Thus, the polarizer may be used for a flexible display device.

Figure 9:
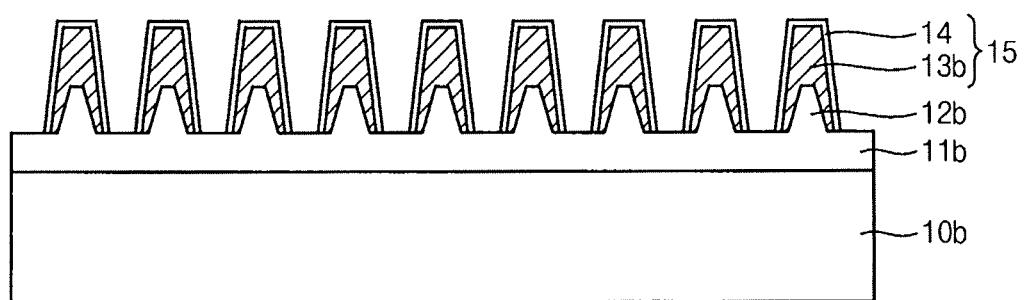
FIG. 9 is a cross-sectional view of a polarizer according to an exemplary embodiment of the present invention.
Figure 10:
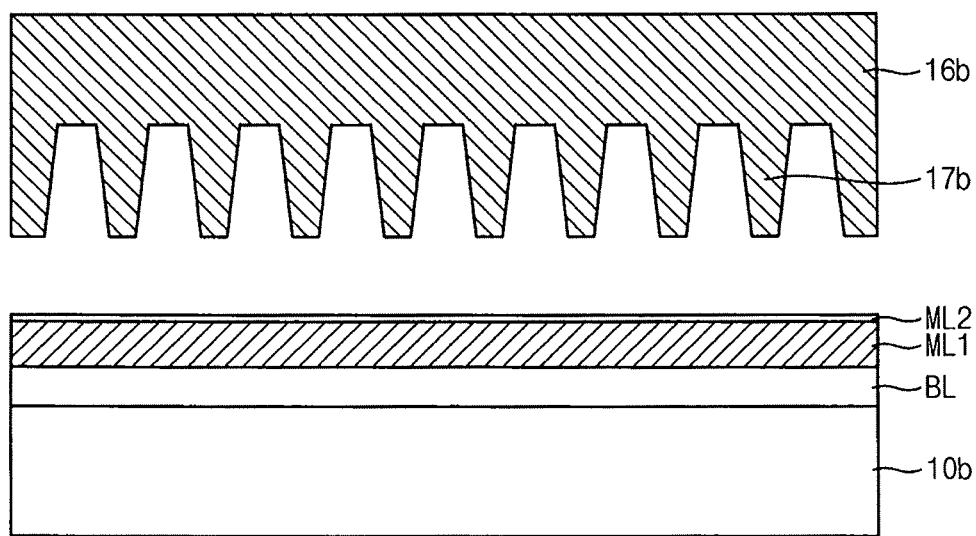
FIGS. 10 and 11 are cross-sectional views illustrating a method of manufacturing the polarizer illustrated in FIG. 9 according to an exemplary embodiment of the present invention.
Figure 11:
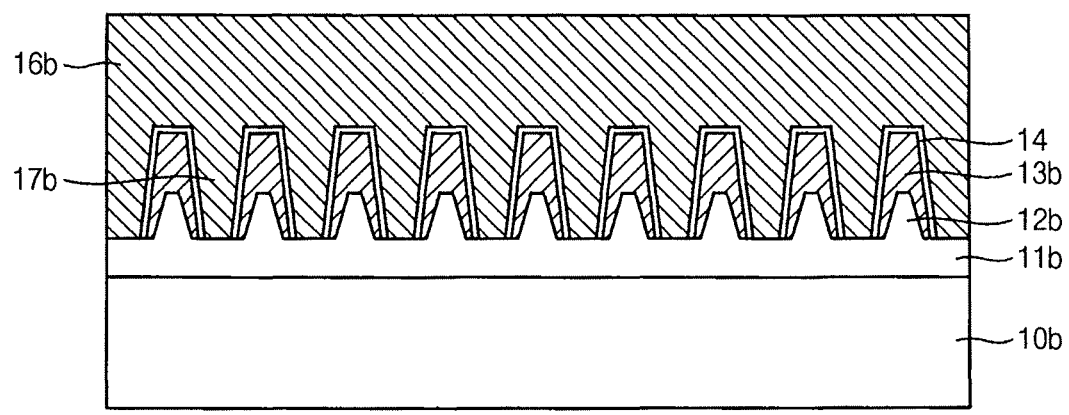

FIG. 9 is a cross-sectional view of a polarizer according to an exemplary embodiment of the present invention. FIGS. 10 and 11 are cross-sectional views illustrating a method of manufacturing the polarizer illustrated in FIG. 9.

In the following exemplary embodiments, any duplicated explanation for elements having same functions and including same materials as the polarizer of FIGS. 1 to 3 may be omitted.

Referring to FIG. 9, a polarizer includes a base substrate 10b, a buffer member 11b disposed on the base substrate 10b, and a wire grid array disposed on the buffer member 11b. The wire grid array includes a plurality of linear metal patterns 15 extending in a first direction and spaced apart from each other in a second direction crossing the first direction. The buffer member 11b includes a plurality of protrusions 12b. Each protrusion 12b is covered by a respective linear metal pattern 15. In an exemplary embodiment, at least a portion of each protrusion 12b is inserted into a respective linear metal pattern 15.

The linear metal pattern 15 includes a lower metal pattern 13b and an upper protective pattern 14 covering the lower metal pattern 13b. The protrusion 12b of the buffer member 11b is inserted into the lower metal pattern 13b. The upper protective pattern 14 covers an upper surface and a side surface of the lower metal pattern 13b.

The lower metal pattern 13b and the upper protective pattern 14 are formed of different materials from each other. For example, the lower metal pattern 13b may include aluminum, gold, silver, copper or an alloy thereof. The upper protective pattern 14 may include molybdenum, tungsten, titanium, nickel, an alloy thereof, an oxide thereof or a nitride thereof. The upper protective pattern 14 may serve to protect the lower metal pattern 13b in the following processes after the formation of the lower metal pattern 13b.

Referring to FIGS. 10 and 11, a buffer layer BL is formed on a base substrate 10b. A first metal layer ML1 is formed on the buffer layer BL. A second metal layer ML2 is formed on the first metal layer ML1. In an exemplary embodiment, the second metal layer ML2 is thinner than the first metal layer ML1.

The buffer layer BL may include a polymer exemplified in the above.

The first metal layer ML1 may include aluminum, gold, silver, copper or an alloy thereof. The second metal layer ML2 may include molybdenum, tungsten, titanium, nickel or an alloy thereof.

After the second metal layer ML2 is formed on the base substrate 10b, the base substrate 10b is pressed using a mold 16b having a pressing pattern 17b. In the pressing, the first and second metal layers ML1 and ML2, and the base layer BL are pressed to the extent that the structure of FIG. 9 is formed.

As a result, a wire grid array including a plurality of linear metal patterns spaced apart from each other, each of the linear metal patterns including a lower metal pattern 13b and an upper protective pattern 14, is formed.

Figure 12:
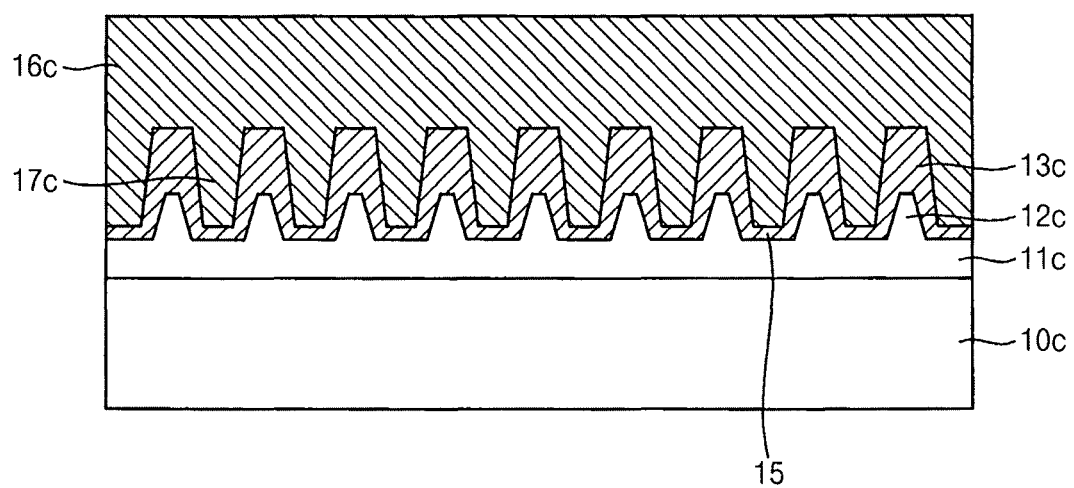
FIGS. 12 to 14 are cross-sectional views illustrating a method of manufacturing a polarizer according to an exemplary embodiment of the present invention.
Figure 13:
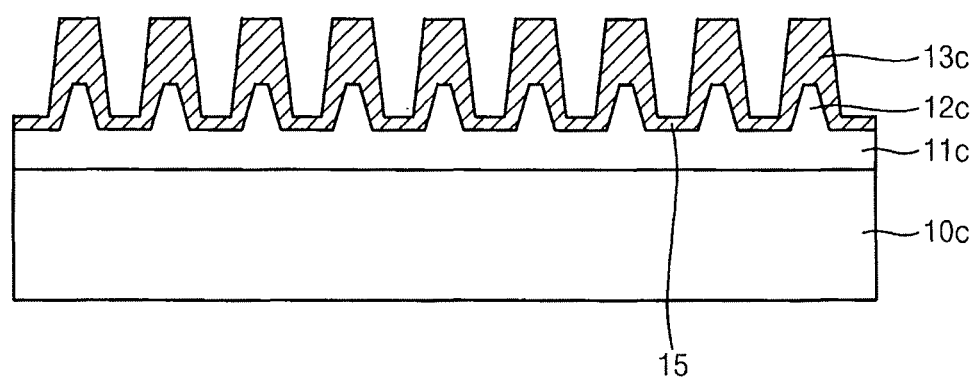
Figure 14:
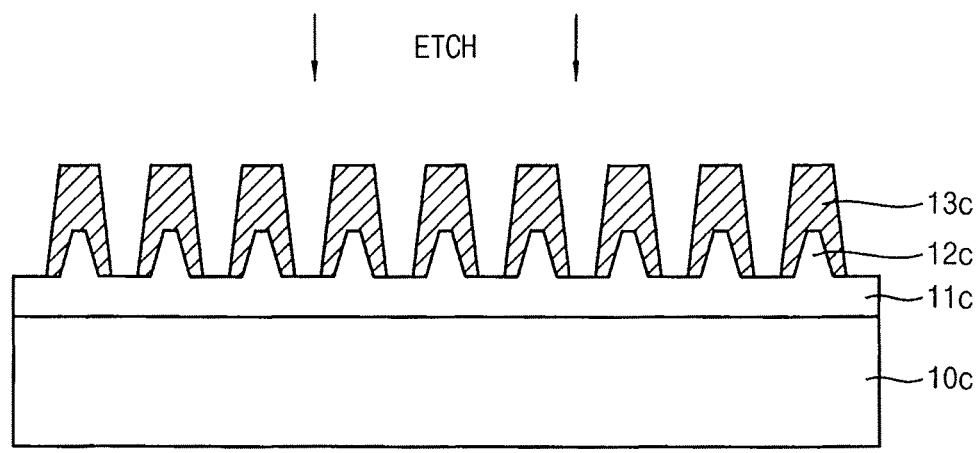

FIGS. 12 to 14 are cross-sectional views illustrating a method of manufacturing a polarizer according to an exemplary embodiment of the present invention.

Referring to FIGS. 12 and 13, a mold 16c including a pressing pattern 17c is used for pressing a metal layer to form a linear metal pattern 13c and a buffer member 11c including a protrusion 12c. According to a pressing process condition, linear metal patterns 13c, shown in FIG. 13c, are connected to each other by a connection portion 15 which remain after the pressing process.

As illustrated in FIG. 14, the connection portion 15 is removed using an etching process. For example, after the mold 16c is lifted off from the base substrate 10c, an etchant ETCH is provided so that the connection portion 15 is removed. The linear metal pattern 13c is partially removed in the etching process of removing the connection portion 15. In the process of removing the connection portion 15, a thickness of the linear metal pattern 13c is reduced, and a spacing between two adjacent liner metal patterns 13c increases. The etching process may include an isotropic etching process or an anisotropic etching process. For preventing damage of a profile of the linear metal pattern 13c, the connection portion 15 may be removed through an anisotropic etching process.

Alternatively, the connection portion 15 need not be removed if the connection portion 15 is thin to the extent that visible light passes through the connection portion 15. For example, if the connection portion 15 including aluminum may have a thickness equal to or less than about 10 nm, visible light may pass through the connection portion 15 and thus the connection portion need not be removed. Thus, the wire grid array having the connection portion 15 may serve to polarize incoming light.

Figure 15:
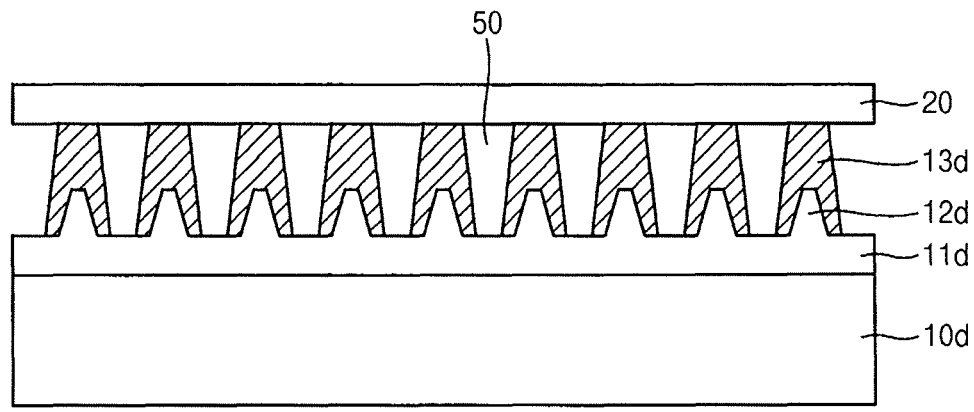
FIG. 15 is a cross-sectional view of a polarizer according to an exemplary embodiment of the present invention.

FIG. 15 is a cross-sectional view of a polarizer according to an exemplary embodiment of the present invention.

Referring to FIG. 15, a polarizer includes a base substrate 10d, a buffer member 11d disposed on the base substrate 10d, a plurality of linear metal patterns 13d disposed on the buffer member 11d, and a protective layer 20 disposed on the linear metal patterns 13d. The linear metal patterns 13d extend in a first direction and spaced apart from each other in a second direction crossing the first direction. The buffer member 11d includes a protrusion 12d. Each linear metal pattern 13d covers a respective protrusion 12d. In an exemplary embodiment, at least a portion of each protrusion 12d may be inserted into a respective linear metal pattern 13d.

The protective layer 20 has a continuous film shape. The protective layer 20 protects the linear metal patterns 13d. The protective layer 30 has a shape of a flat thin film opposite to the buffer member 11d. Thus, an air gap 50 is formed between adjacent linear metal patterns 13d. The air gap 50 may increase a refractivity difference of the polarizer to improve polarizing characteristics.

The protective layer 20 may be formed of an inorganic insulating material including silicon oxide (SiOx), silicon oxicarbide (SiOC), silicon nitride (SiNx) or the like. A thickness of the protective layer 20 may be about 100 nm to about 1 um. For example, the protective layer 20 may be formed using a chemical vapor deposition process.

While the polarizer includes the protective layer having a shape of a flat thin film such that an air gap is formed between adjacent linear patterns in the exemplary embodiment, a polarizer according to another exemplary embodiment may include an organic insulation layer or an inorganic insulation layer, which fills the gap 50 between the linear patterns.

Figure 16:
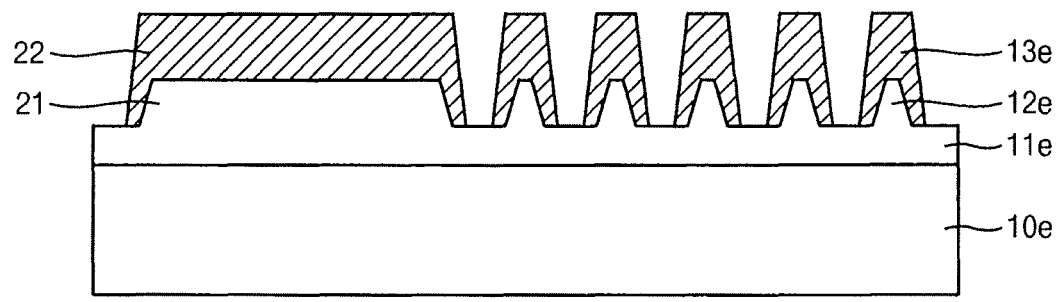
FIG. 16 is a cross-sectional view of a polarizer according to an exemplary embodiment of the present invention.
Figure 17:
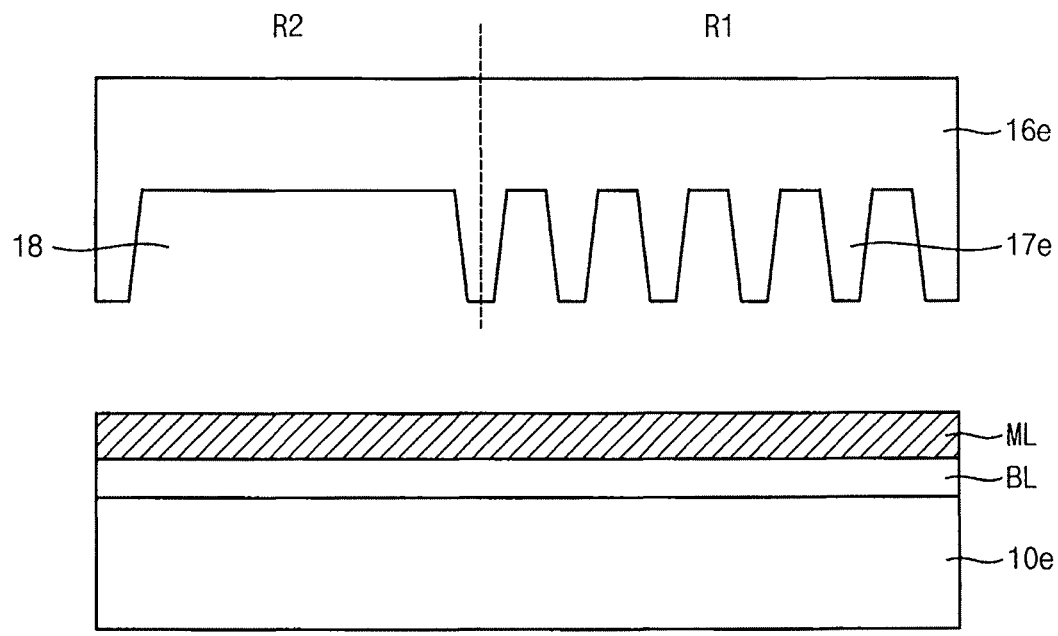
FIGS. 17 and 18 are cross-sectional views illustrating a method of manufacturing the polarizer of FIG. 16 according to an exemplary embodiment of the present invention.
Figure 18:
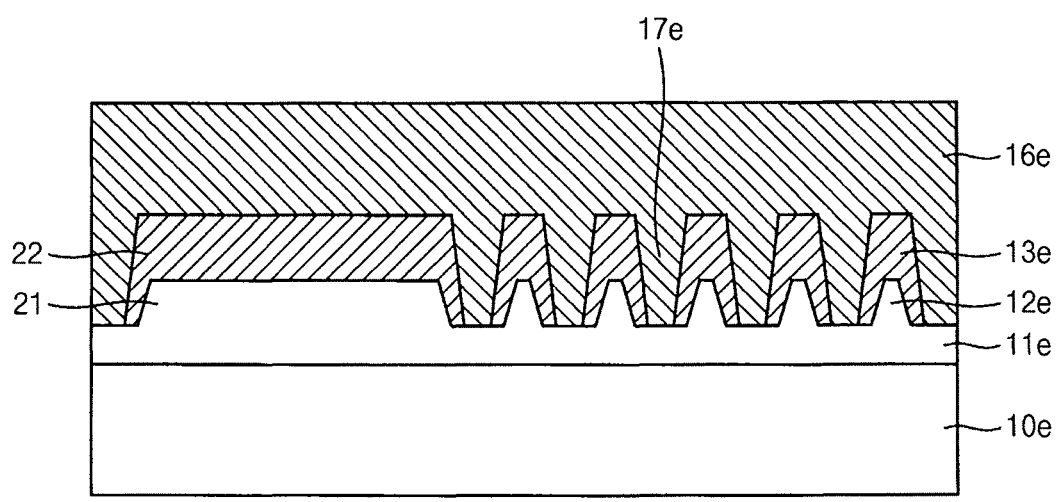

FIG. 16 is a cross-sectional view of a polarizer according to an exemplary embodiment of the present invention. FIGS. 17 and 18 are cross-sectional views illustrating a method for manufacturing the polarizer of FIG. 16.

Referring to FIG. 16, a polarizer includes a base substrate 10e, a buffer member 11e disposed on the base substrate 10e, a wire grid array disposed on the buffer member 11e, and a reflective part 22 formed of the same layer as the wire grid array. The wire grid array includes a plurality of linear metal patterns 13e extending in a first direction and spaced apart from each other in a second direction crossing the first direction. The buffer member 11e includes a first protrusion 12e and a second protrusion 21. At least a portion of the first protrusion 12e is inserted into the linear metal pattern 13e. At least a portion of the second protrusion 22 is inserted into the reflective part 22.

The reflective part 22 has a width greater than the linear metal pattern 13e. The second protrusion 21 has a width greater than the first protrusion 12e. The polarizer including the reflective part 22 may reflect a light incident thereon to increase reuse of a light in a liquid crystal display panel.

Referring to FIGS. 17 and 18, a buffer layer BL is formed on a base substrate 10e, and a metal layer ML is formed on the buffer layer BL.

After the metal layer ML is formed, a mold 16e including a pressing pattern 17e is disposed on the metal layer ML to press the metal layer ML. A plurality of pressing patterns 17e are spaced apart from each other by a first distance in a first area R1 of the mold 17e to form a wire grid pattern, and are spaced apart from each other by a second distance greater than the first distance in a second area R2 of the mold 17e to form a reflective groove 18.

As a result, a wire grid array and a reflective part 22 formed of the same layer as the wire grid array are formed.

Figure 19:
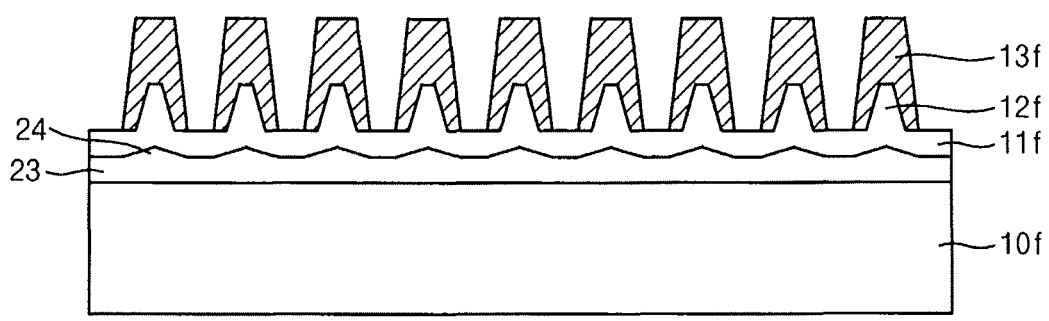
FIG. 19 is a cross-sectional view of a polarizer according to an exemplary embodiment of the present invention.
Figure 20:
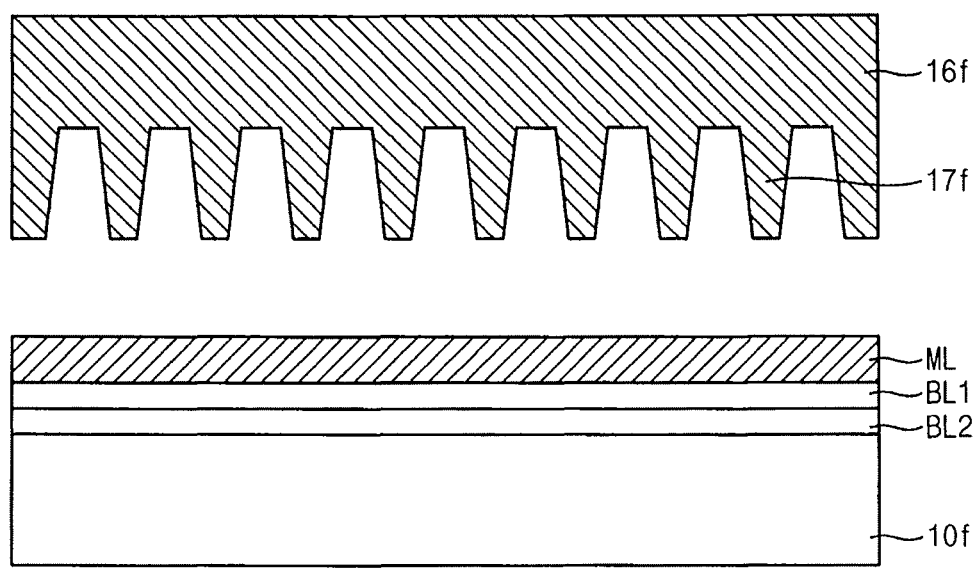
FIGS. 20 and 21 are cross-sectional views illustrating a method of manufacturing the polarizer of FIG. 19 according to an exemplary embodiment of the present invention.
Figure 21:
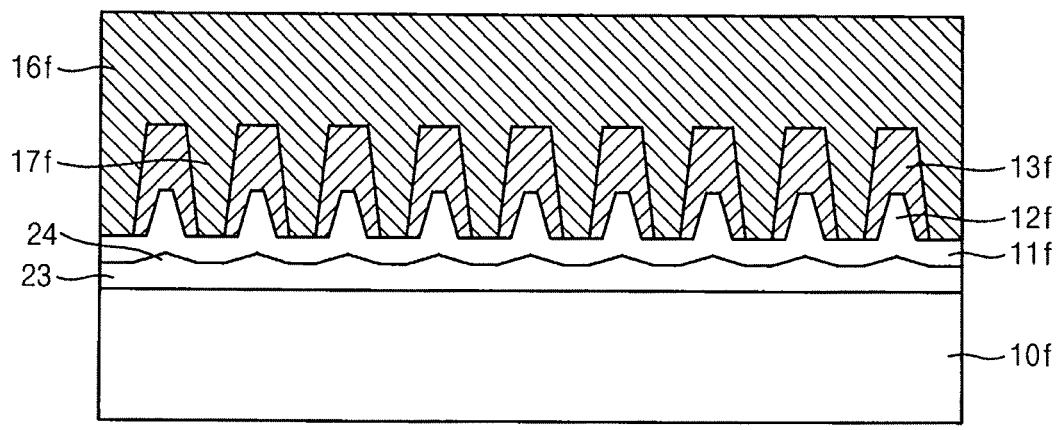

FIG. 19 is a cross-sectional view of a polarizer according to an exemplary embodiment. FIGS. 20 and 21 are cross-sectional views illustrating a method of manufacturing the polarizer illustrated in FIG. 19.

Referring to FIG. 19, a polarizer includes a base substrate 10f, a rubber-phase buffer member 23 disposed on the base substrate 10f, a solid-phase buffer member 11f disposed on the rubber-phase buffer member 23, and a wire grid array disposed on the solid-phase buffer member 11f. The wire grid array includes a plurality of linear metal patterns 13f extending in a first direction and spaced apart from each other in a second direction crossing the first direction. The solid-phase buffer member 11f includes a protrusion 12f. At least a portion of the protrusion 12f is inserted into the linear metal pattern 13f.

The solid-phase buffer member 11f and the rubber-phase buffer member 23 are formed of different materials.

For example, the rubber-phase buffer member 23 may include a polymer having a rubber phase at a room temperature. For example, the rubber-phase buffer member 23 may include a polymer having a softening point equal to or less than about 50° C. For example, the rubber-phase buffer member 23 may include polyethylene, polypropylene, polydimethyl siloxane or a copolymer thereof. In an exemplary embodiment, the rubber-phase buffer member 23 may include polydimethyl siloxane or a copolymer thereof.

The solid-phase buffer member 11f may include a polymer having a solid (glass) phase at a room temperature. For example, the solid-phase buffer member 11f may include a polymer having a softening point equal to or more than about 100° C. For example, the solid-phase buffer member 11f may include polyethylene terephthalate, polycarbonate or a copolymer thereof.

The rubber-phase buffer member 23 may include a protrusion 24 overlapping the protrusion 12f of the solid-phase buffer member 11f.

Referring to FIGS. 20 and 21, a first buffer layer BL1, a second buffer layer BL2 and a metal layer ML are formed on a base substrate 10f.

The first buffer layer BL1 includes a polymer having a rubber phase at a room temperature, for example, having a softening point equal to or less than about 50° C. The second buffer layer BL2 having a solid phase at a room temperature, for example, having a softening point equal to or more than about 100° C.

After the metal layer ML is formed, a mold 16f including a pressing pattern 17f is disposed on the metal layer ML to press the metal layer ML.

In the process of pressing the metal layer ML, the second buffer layer BL2 is heated by a temperature equal to or more than the softening point of second buffer layer BL2 and turned into a rubber phase. Thus, the pressing pattern 17f may penetrate into the metal layer ML to the extent that the metal layer ML is disconnected by the pressing pattern 17.

When the mold 16f is removed, a temperature is reduced. Thus, a solid-phase buffer member 11f and a protrusion 12f formed from the second buffer layer BL2 is solidified. Thus, arrangement of a wire grid array disposed on the solid-phase buffer member 11f may be prevented from changing.

A rubber-phase buffer member 23 formed from the first buffer layer BL1 provides resilience and flexibility to a polarizer at a room temperature to prevent separation by an external force and to increase flexibility of the polarizer.

In an exemplary embodiment, the rubber-phase buffer member 23 includes the protrusion 24 to form an uneven upper surface. Alternatively, the rubber-phase buffer member 23 does not include the protrusion 24 so that the rubber-phase buffer member 23 has a flat upper surface according to properties of a polymer included therein or manufacturing conditions.

In an exemplary embodiment, the linear metal patterns have a tapered shape. The present invention is not limited thereto, and may have various shapes.

Figure 22:
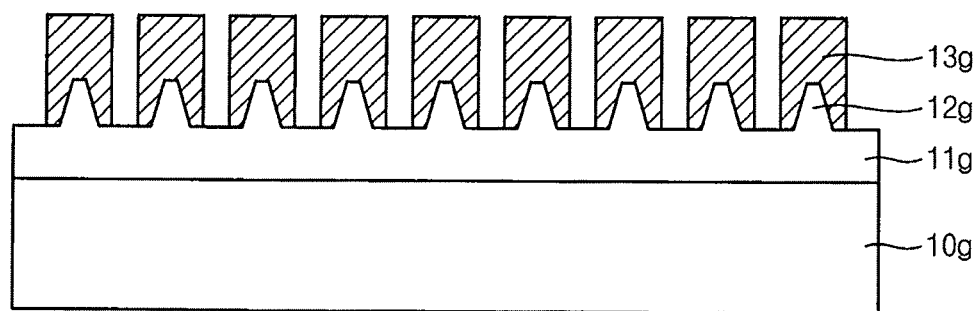
FIGS. 22 to 24 are cross-sectional views of polarizers according to exemplary embodiments of the present invention.

For example, referring to FIG. 22, a polarizer includes a base substrate 10g, a buffer member 11g disposed on the base substrate 10g, and a wire grid array disposed on the buffer member 11g and including a linear metal pattern 13g. The buffer member 11g includes a protrusion 12g inserted into the linear metal pattern 13g. The linear metal pattern 13g has a substantially rectangular shape. Thus, a side surface of the linear metal pattern 13g may extend in a direction substantially perpendicular to an upper surface of the base substrate 10g. The rectangular shape of the linear metal pattern 13g may increase polarization properties of the polarizer.

Figure 23:
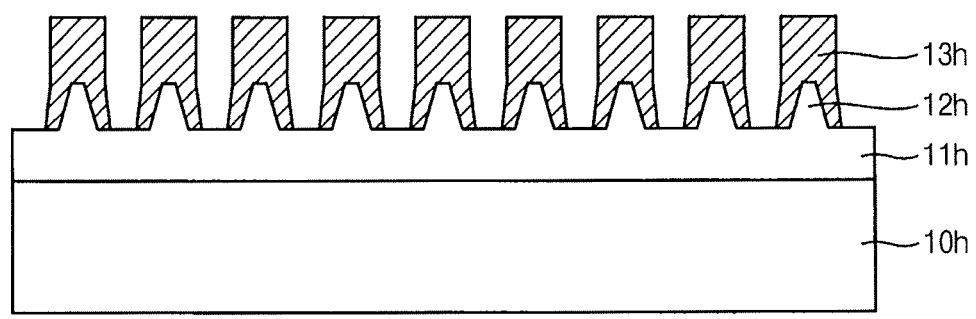

Referring to FIG. 23, a polarizer includes a base substrate 10h, a buffer member 11h disposed on the base substrate 10h, and a wire grid array disposed on the buffer member 11h and including a linear metal pattern 13h. The buffer member 11h includes a protrusion 12h inserted into the linear metal pattern 13h. The linear metal pattern 13h includes a lower portion wider than an upper portion. The side surface of the upper portion extends in a direction substantially perpendicular to an upper surface of the base substrate 10h. The side surface of the lower portion extends to form an angle less than about 90° with the upper surface of the base substrate 10h. The linear metal pattern 13h may increase polarization properties of the polarizer. Furthermore, since the linear metal pattern 13h is formed by a mold having a sharp end, a metal layer may be easily disconnected.

Figure 24:
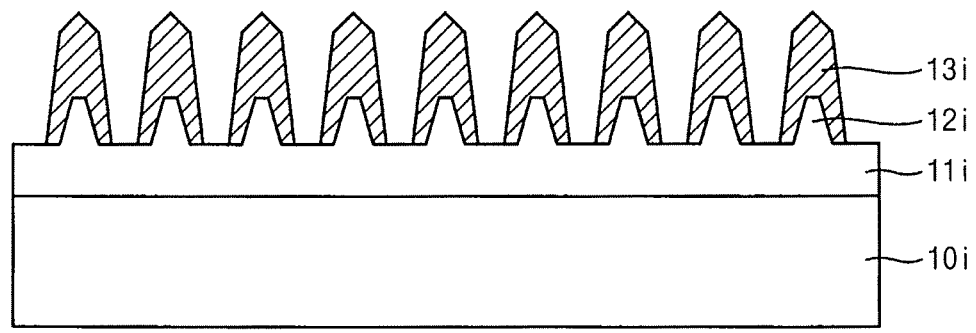

Referring to FIG. 24, a polarizer includes a base substrate 10i, a buffer member 11i disposed on the base substrate 10i, and a wire grid array disposed on the buffer member 11*i* and including a linear metal pattern 13*i*. The buffer member 11*i* includes a protrusion 12*i* inserted into the linear metal pattern 13*i*. The linear metal pattern 13*i* includes an upper portion and a lower portion having a side surface in a different direction from the upper portion. For example, an upper portion has a taper angle smaller than the lower portion. The linear metal pattern 13*i* includes two portions having different taper angles. Alternatively, the linear metal pattern 13*i* may have a moth-eye shape such that a taper angle is gradually reduced from an lower end toward an upper end. The linear metal pattern 13*i* may reduce reflectance of a light incident thereon to achieve anti-reflectance.

According to exemplary embodiments, a wire grid array pattern may be directly transferred by a mold without an etching process using a mask. Thus, a wire grid array pattern may have various profiles as desired.

Figure 25:
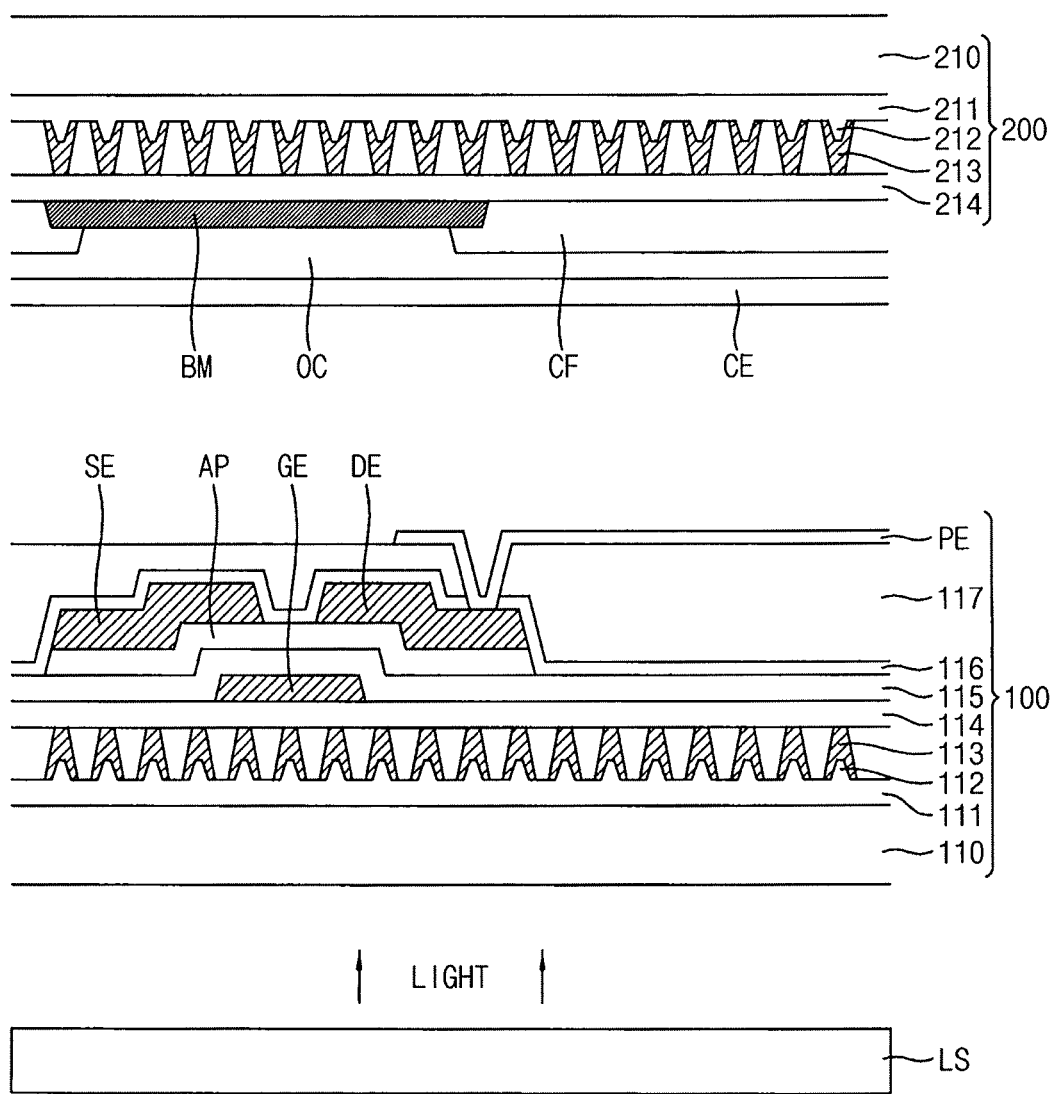
FIG. 25 is a cross-sectional view of a display panel according to an exemplary embodiment of the present invention.
Figure 26:
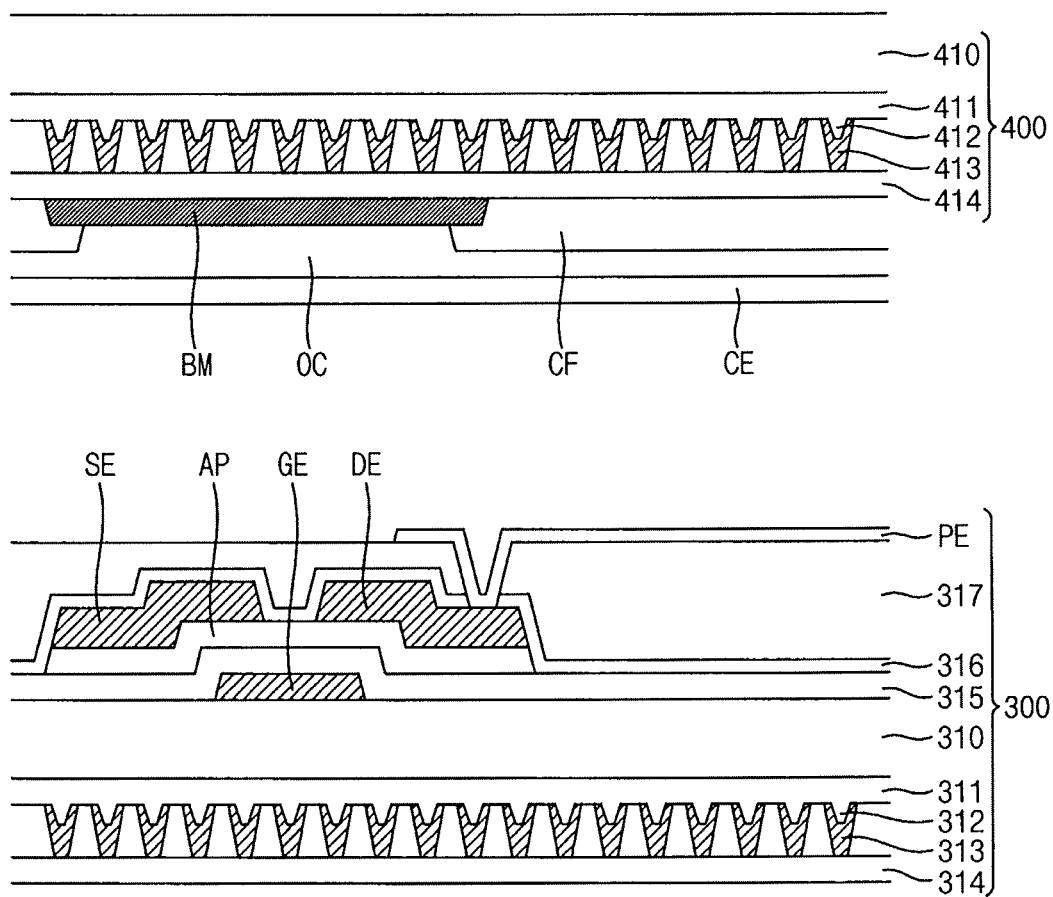
FIG. 26 is a cross-sectional view of a display panel according to an exemplary embodiment of the present invention.
Figure 27:
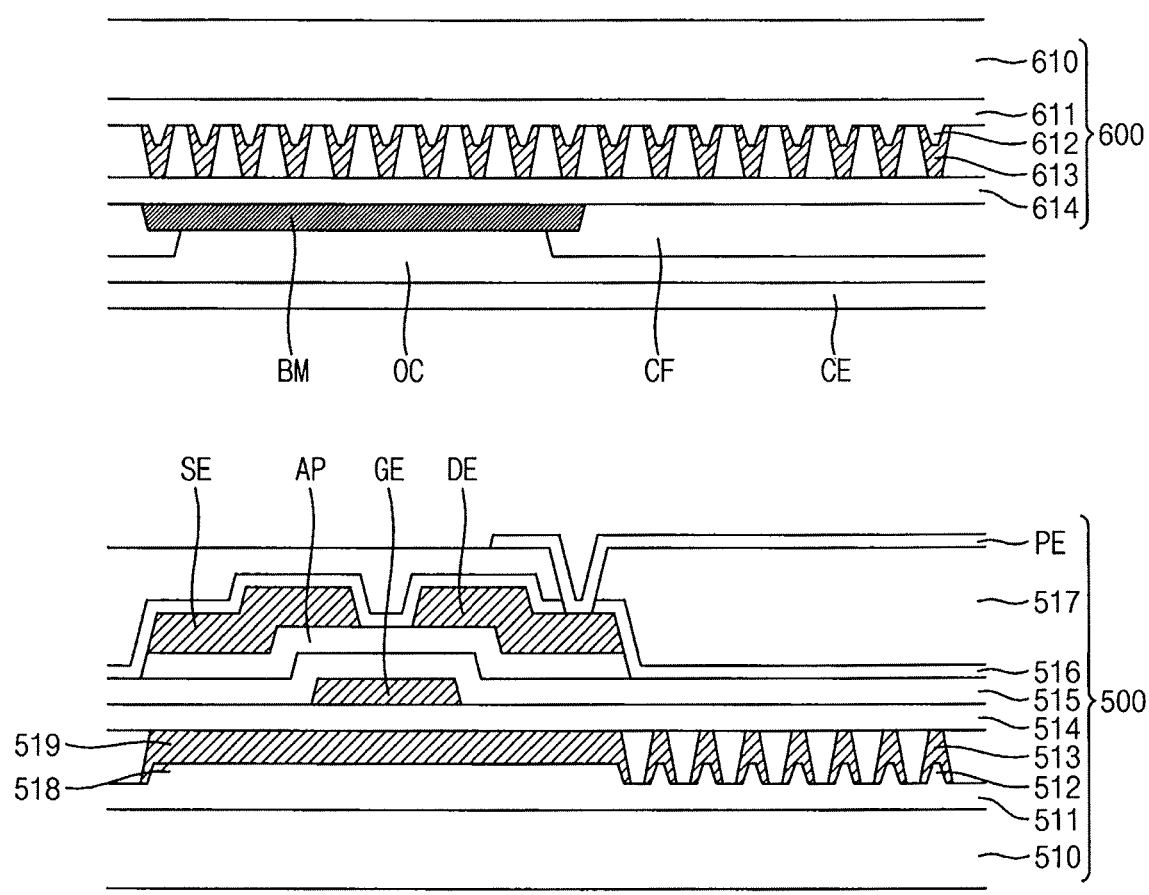
FIG. 27 is a cross-sectional view of a display panel according to an exemplary embodiment of the present invention.

FIG. 25 is a cross-sectional view of a display panel according to an exemplary embodiment. FIG. 26 is a cross-sectional view of a display panel according to an exemplary embodiment. FIG. 27 is a cross-sectional view of a display panel according to an exemplary embodiment.

Referring to FIG. 25, a display panel includes a first substrate 100, a second substrate 200 facing the first substrate 100 and a liquid crystal layer interposed between the first substrate 100 and the second substrate 200. The display panel receives a light LIGHT from a light source module LS disposed under the display panel to display an image.

The first substrate 100 includes a first polarizer and a thin film transistor array. A light incident on the first polarizer from the light source module LS may be partially transmitted and partially reflected. The reflected light by the first polarizer may enter the light source module LS, and may be reflected by a reflective member of the light source module LS to re-enter the display panel.

The first substrate 100 includes a first base substrate 110, a first buffer member 111, a wire grid array including a first linear metal pattern 113, a first protective layer 114, a gate electrode GE, a gate insulation layer 115, an active pattern AP, a source electrode SE, a drain electrode DE, a passivation layer 116, an organic insulation layer 117 and a pixel electrode PE.

The first buffer member 111 is disposed between the first base substrate 110 and the wire grid array. The first buffer member 111 includes a polymer. The first buffer member 111 includes a protrusion 112 upwardly protruding from an upper surface of the first buffer member 111. At least a portion of the protrusion 112 is inserted into the first linear metal pattern 113 so that an upper surface and a side surface of the protrusion 112 are covered by the first linear metal pattern 113.

The protrusion 112 and the first linear metal pattern 113 extend in a first direction. A plurality of protrusions 112 and a plurality of first linear metal patterns 113 are arranged in a second direction crossing the first direction to be parallel with each other. The protrusion 112 and the first buffer member 111 are formed in a single unitary unit which is formed of the same material.

The wire grid array may serve to polarize the incident light LIGHT. The first linear metal pattern 113 includes a metal. In an exemplary embodiment, the first linear metal pattern 113 may be formed of a multi-layered structure including different metal layers. In this case, the first linear metal pattern 113 may further include a metal oxide, a metal nitride or the like.

The protrusion 112 and the first linear metal pattern 113 may have a tapered shape of which a lower end is wider than an upper end. A taper angle of the protrusion 112 may be less than a taper angel of the first linear metal pattern 113.

The first protective layer 114 is formed on the wire grid array to protect the wire grid array.

The first polarizer is substantially the same as the polarizer of FIG. 15. Thus, the description of the first polarizer will be omitted.

The gate electrode GE, the active pattern AP, the source electrode SE and the drain electrode DE form a thin film transistor. The thin film transistor is electrically connected to the pixel electrode PE. The thin film transistor is disposed between the first polarizer and the first base substrate 111. The thin film transistor array may be formed on the first polarizer after the first polarizer is formed on the first base substrate 111.

The gat electrode GE is disposed on the first protective layer 114. The gate electrode GE is electrically connected to a gate line that extends in a direction on the first base substrate 111. The gate electrode GE may include aluminum, copper, chrome, molybdenum, tungsten, titanium, gold, silver, nickel or an alloy thereof. Furthermore, the gate electrode GE may have a single-layered structure or a multiple-layered structure including different metal layers. For example, the gate electrode GE may have a triple-layered structure of aluminum/molybdenum/aluminum or a double-layered structure including an upper layer of copper, and a lower layer of titanium.

The gate insulation layer 115 covers the gate electrode GE. The gate insulation layer 115 may include an inorganic insulation material such as silicon oxide, silicon nitride or the like. The gate insulation layer 115 may have a single-layered structure or a multiple-layered structure including different materials. For example, the gate insulation layer 115 may include an upper layer including silicon oxide and a lower layer including silicon nitride.

The active pattern AP is disposed on the gate insulation layer 115, and overlaps the gate electrode GE. The active pattern AP forms a channel between the source electrode SE and the drain electrode DE. The active pattern AP may include amorphous silicon, polysilicon, oxide semiconductor or the like. When the active pattern AP includes amorphous silicon, the active pattern AP may further include an ohmic contact layer contacting the source electrode SE and the drain electrode DE. The oxide semiconductor may include a multi-component metal oxide such as indium gallium oxide, indium gallium zinc oxide or the like.

The source electrode SE is electrically connected to a data line. The data line, the source electrode SE and the drain electrode DE may be formed of the same metal layer. The source electrode SE may include aluminum, copper, chrome, molybdenum, tungsten, titanium, gold, silver, nickel or an alloy thereof. Furthermore, the source electrode SE may have a single-layered structure or a multiple-layered structure including different metal layers. For example, the source electrode SE may have a triple-layered structure of aluminum/molybdenum/aluminum or a double-layered structure including an upper layer of copper, and a lower layer of titanium. Alternatively, the source electrode SE may include a barrier layer including a metal oxide. For example, the source electrode SE may include a copper layer and a metal oxide layer disposed on or under the copper layer. The metal oxide layer may include indium zinc oxide, indium gallium oxide, gallium zinc oxide or the like.

The passivation layer 116 covers the source electrode SE, the drain electrode DE and the gate insulation layer 115. The passivation layer 116 may include an inorganic insulation material such as silicon oxide, silicon nitride or the like.

The organic insulation layer 117 is disposed on the passivation layer 116 to planarize the substrate. The organic insulation layer 117 may include an organic insulation material such as an acryl resin, a phenol resin or the like. Alternatively, the passivation layer 116 and/or the organic insulation layer 117 may be omitted.

The pixel electrode PE is disposed on the organic insulation layer 117. The pixel electrode PE is electrically connected to the drain electrode DE. A pixel voltage is applied to the pixel electrode PE through the thin film transistor so that an electric field is formed by a voltage difference between the pixel voltage and a common voltage applied to a common electrode.

In an exemplary embodiment, the pixel electrode PE passes through the passivation layer 116 and the organic insulation layer 117 to contact the drain electrode DE. The pixel electrode PE may include a transparent conductive material such as indium tin oxide, indium zinc oxide or the like.

The second substrate 200 includes a second base substrate 210, a second buffer member 211 including a protrusion 212, a wire grid array including a second linear metal pattern 413, a second protective layer 214, a light-blocking member BM, an overcoating layer OC and a common electrode CE.

The second polarizer including the second buffer member 211 including the protrusion 212, the second linear metal pattern 213 and the second protective layer 214 is substantially the same as the first polarizer. The first and second polarizes are arranged to face each other. For example, the protrusions 112 and 212 of the first and second buffer members face each other in opposite directions. Thus, the description of the second polarizer will be omitted.

The second linear metal pattern 213 extends in the same direction as the first linear metal pattern 113. The present invention is not limited thereto. For example, the second linear metal pattern 213 may extend in a different direction from the first linear metal pattern 113, for example, in a perpendicular direction to the first linear metal pattern 113.

The light-blocking member BM is disposed on the second protective layer 214. The light-blocking member BM may be a black matrix having a matrix shape. The light-blocking member BM overlaps the thin film transistor.

The color filter CF is disposed on the second protective layer 214. The color filter CF faces and overlaps the pixel electrode PE. The color filter CF may include a red filter, a green filter, a blue filter, a cyan filter, a yellow filter, a magenta filter, a white filter or the like.

The overcoating layer OC covers the light-blocking member BM and the color filter CF. The overcoating layer OC may include an organic insulation material.

The common electrode CE is disposed on the overcoating layer OC and overlaps the pixel electrode PE. The common electrode CE may include a transparent conductive material such as indium tin oxide, indium zinc oxide or the like.

In an exemplary embodiment, the pixel electrode PE is disposed in the first substrate 100, and the common electrode CE is disposed in the second substrate 200. The present invention is not limited thereto. For example, a pixel electrode and a common electrode may be disposed in the same substrate. A color filter and/or a light-blocking member may be disposed in a substrate having a thin film transistor substrate.

According to an exemplary embodiment, the display panel includes a wire grid polarizer. The wire gird polarizer may share a base substrate with display substrates to reduce a thickness of the display panel, and may substitute for an absorptive polarizer, which is expensive.

Furthermore, the polarizer may be manufacture without an etching process using a mask. Thus, profile of a metal pattern may be protected, and manufacturing efficiency may be increased.

Furthermore, a lower surface of a linear metal pattern of the polarizer forms an uneven surface due to a protrusion of a buffer member. The uneven surface may prevent reflectance of an external light to increase display quality of the display panel.

Referring to FIG. 26, a display panel includes a first substrate 300, a second substrate 400 facing the first substrate 300 and a liquid crystal layer interposed between the first substrate 300 and the second substrate 400.

The first substrate 300 includes a first polarizer and a thin film transistor array. The first substrate 300 includes a first base substrate 310, a first buffer member 311 including a protrusion 312, a wire grid array including a first linear metal pattern 313, a first protective layer 314, a gate electrode GE, a gate insulation layer 315, an active pattern AP, a source electrode SE, a drain electrode DE, a passivation layer 316, an organic insulation layer 317 and a pixel electrode PE.

The second substrate 400 includes a second base substrate 410, a second buffer member 411 including a protrusion 412, a wire grid array including a second linear metal pattern 413, a second passivation layer 414, a light-blocking member BM, an overcoating layer OC and a common electrode CE.

The first substrate 300 is substantially the same as the first substrate 100 illustrated in FIG. 25 except that the first base substrate 310 is disposed between the first polarizer and the thin film transistor array, and that the first polarizer is vertically inversed. In this case, the protrusions of 312 and 413 of the first and second buffer members 311 and 411 face in the same direction.

The second substrate 400 is substantially the same as the second substrate 200 of FIG. 25.

An uneven surface of the first linear metal pattern 313 faces the liquid crystal layer. Thus, transmittance of a light provided to the first substrate 300 from the light source module may be increased.

Referring to FIG. 27, a display panel includes a first substrate 500, a second substrate 600 facing the first substrate 500 and a liquid crystal layer interposed between the first substrate 500 and the second substrate 600.

The first substrate 500 includes a first polarizer and a thin film transistor array. The first substrate 500 includes a first base substrate 510, a first buffer member 511 including a protrusion 512, a wire grid array including a first linear metal pattern 513, a first protective layer 514, a gate electrode GE, a gate insulation layer 515, an active pattern AP, a source electrode SE, a drain electrode DE, a passivation layer 516, an organic insulation layer 517 and a pixel electrode PE.

The second substrate 600 includes a second base substrate 610, a second buffer member 611 including a protrusion 612, a wire grid array including a second linear metal pattern 613, a second passivation layer 614, a light-blocking member BM, an overcoating layer OC and a common electrode CE.

The first substrate 500 is substantially the same as the first substrate 100 of FIG. 25 except that the first substrate 500 further includes a reflective part 519 formed of the same layer as the wire grid array and that the first buffer member 511 further includes a second protrusion 518, of which at least a portion is inserted into the reflective part 519.

The second substrate 600 is substantially the same as the second substrate 200 of FIG. 25.

The reflective part 519 is formed of the same material of the first linear metal pattern 513. Furthermore, the reflective part 519 has a width greater than the first linear metal pattern 513. The reflective part 519 may be disposed in a light-blocking area. For example, the reflective part 519 overlaps a thin film transistor or the light-blocking member BM.

When the first substrate 500 does not include the reflective part 519, a light entering the light-blocking area may be transmitted and absorbed by the light-blocking member BM. The reflective part 519 reflects the light incident thereon so that the reflected light may be reused. Thus, a brightness of the display panel may be increased.

The present invention may be employed in various display devices including a polarizer. For example, the present invention may be employed in an organic light-emitting device or optical devices, which include a polarizer.

While the present invention has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A method of manufacturing a polarizer, the method comprising:
forming a polymer layer and a metal layer, wherein the metal layer is formed on the polymer layer; and
forming a plurality of linear metal patterns from the metal layer and a plurality of protrusions from the polymer layer, by pressing a bottom surface of a mold against the metal layer and the polymer layer, the bottom surface having a plurality of pressing patterns spaced apart from one another to form a groove between each pair of the pressing patterns,
wherein at least a portion of each protrusion is inserted into a respective one of the linear metal patterns as a result of the pressing,
wherein forming the polymer layer comprises:
forming a first polymer layer on a substrate having a softening point equal to or less than about 50° C.; and
forming a second polymer layer having a softening point equal to or more than about 100° C., on the first polymer layer, the second polymer layer contacting the metal layer,
wherein the first polymer layer has a rubber phase at room temperature and the second polymer layer has a solid phase at room temperature.

2. The method of claim 1, wherein the polymer layer includes at least one of polymethylmethacrylate, polydimethyl siloxane, polycarbonate, polyethylene terephthalate, polystyrene, polyethylene, polypropylene, polyvinylalcohol and a copolymer thereof.

3. The method of claim 1, wherein the metal layer includes at least one of aluminum, gold, silver, copper, chromium, iron, nickel, titanium, molybdenum, tungsten and an alloy thereof.

4. The method of claim 1, wherein the mold includes a material having a surface hardness higher than the metal layer.

5. The method of claim 1, wherein the groove has slanted opposing sides.

6. The method of claim 1, wherein a cross-section of a region of the mold including the pressing patterns has a tapered shape so that a width of an upper end is greater than a width of a lower end.

7. The method of claim 1, wherein the first polymer layer includes at least one of polydimethyl siloxane and a copolymer thereof, and the second polymer layer includes at least one of polycarbonate, polyethylene terephthalate and a copolymer thereof.

8. The method of claim 1, wherein during the pressing, further comprising heating the second polymer layer to a temperature corresponding to the softening point of the second polymer layer to cause the second polymer layer to enter the rubber phase.

9. The method of claim 8, further comprising reducing the heating to cause the second polymer layer to enter the solid phase after removing the mold.

10. The method of claim 1, wherein the linear metal patterns are connected to each other by remaining portions of the metal layer after the pressing of the metal layer.

11. The method of claim 10, further comprising performing an etching on the remaining portions until the linear metal patterns are no longer connected to each other.

12. The method of claim 10, wherein the remaining portions are thinner than the linear metal patterns.

13. The method of claim 10, wherein the remaining portions are thinner than the protrusions.

* * * * *